Jan. 10, 1967 M. N. GATTENBY, JR., ET AL 3,297,155
TUBULAR CORES
Filed Nov. 26, 1965

INVENTORS
MILES NADIN GATTENBY, JR.
ANTHONY SALVATORE D'AMATO
JEROLD JULIUS GOLNER
SUMNER SHELDON FEINSTEIN
BY
*Paul Kupel*
ATTORNEY.

3,297,155
TUBULAR CORES
Miles Nadin Gattenby, Jr., Lowell, Anthony Salvatore D'Amato, Chelmsford, Jerold Julius Golner, Lowell, and Sumner Sheldon Feinstein, West Peabody, Mass., assignors to The Borden Company, New York, N.Y., a corporation of New Jersey
Filed Nov. 26, 1965, Ser. No. 509,882
3 Claims. (Cl. 206—59)

This invention relates to film in roll form. More particularly, it relates to controlled cold flow of soft, highly elastic film which has been wound under tension on tubular cores for supporting such film.

Plastics under load are subject to dimensional changes over a period of time. This change in configuration is known as "cold flow" or "crepe." Cold flow is primarily exhibited in soft, highly elastic materials. The latter exhibits more cold flow than does a rigid non-elastic plastic when each is stressed under the same load. Soft, highly elastic film such as plasticized polyvinyl chloride, polyvinylidene chloride, ethylvinyl acetate, rubber hydrochloride, low slip polyethylene, low slip polypropylene and the like, are most economically produced and sold in rolls of film on tubular cores from which the film is unwound. The film is wound on the core under tension which causes a radial load, i.e., perpendicular to the axis of the core. The film under the radial load is forced to "creep," the phenomenon observed being called "cold flow." An increase in the lateral dimension in the film is observed in the layers of film closest to the core. This is due to increasing load or tension on these layers of film which are closest to the core. In cases where the coefficient of friction between the core and the film is greater than between adjacent layers of film near the core, the layers of film closest to the core are restricted in their lateral flow, thereby preventing uniform dimensional change. The result of this restriction and dimensional change is that the layers of film close to the core envelop the next succeeding innermost layer. These enveloped layers ultimately cause the film to tear as it is unwound, rendering the film useless where enveloping has occurred.

The present invention overcomes the problem of restricted dimensional change in the film layers closest to the core and permits controlled flow in the lateral dimension in every layer of film wound on the core.

Briefly stated, the present invention comprises a supporting tubular core, soft, highly elastic film wound thereon under tension and a movable collar device on the core and in communication with the core and the bottom-most layer of film. The collar device covers the line of intersection between the film and the core.

The collar is characterized as having a coefficient of friction between it and the core less than between it and the film. The coefficient of friction between the collar and the core should not be greater than the coefficient of friction between adjacent layers of film near the core.

This relationship of the coefficients of friction between the film, the collar, and the core provides a system wherein there is caused preferential lateral movement of the collar over the core. The film is thereby carried with the collar and prevented from enveloping and bowing in the undermost layers.

The invention described may be accomplished in a variety of physical embodiments. Examples of the preferred embodiments are shown in the drawings to which reference is now made.

Figure 1:
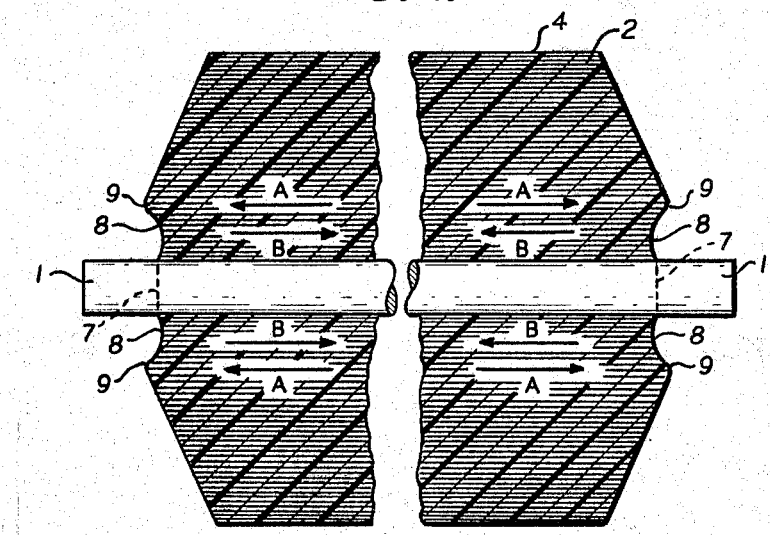
FIGURE 1 is a transverse cross-sectional view of a roll of film which has been wound under tension on a core without the collar devices of the instant invention and does not form any part of the instant invention. It is shown in order to more clearly describe the prior art.

Referring now to the drawings in more detail, and specifically FIG. 1, core 1 supports film roll 2, which film has been wound on said core under tension. The arrows A denote forces tending to cause lateral dimensional deformation with time. Core 1 intersects film roll 2 at intersection 7. When the coefficient of friction between film roll 2 and core 1 is greater than the coefficient of friction between adjacent layers of said film, lateral forces A are insufficient to overcome frictional forces B, acting in a direction opposite to lateral forces A. The effect is that the layers of film roll 2 closest to core 1 are restricted in their lateral dimensional flow. With increasing radial dimension from the center-line of said core, however, lateral forces A gradually overcome frictional resistive forces B and at that point enveloping 9 occurs on the film roll 2. Numeral 8 represents a bowing effect between intersection 7 and enveloping 9. In film layers at radial distances from the center line greater than enveloping 9, there is a uniform tapering of roll 2 which is proportional to the decreasing lateral forces A with increasing radius. Outermost film layer 4 is of lateral dimension substantially equal to the film as wound on core 1.

Figure 2:
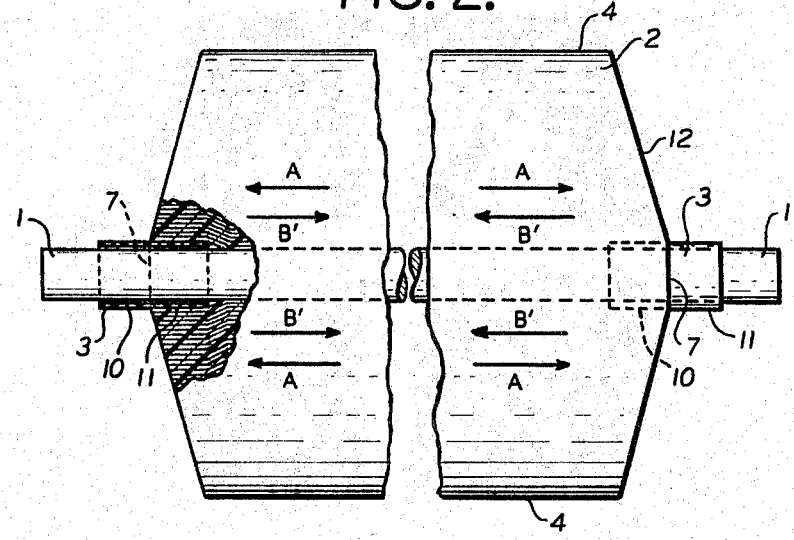
FIG. 2 is an elevational view partly in section of a roll of film wound under tension on a core with collar devices and is an example of the instant invention.

Referring now to FIG. 2, collar device 3 is disposed between the undermost film layer of roll 2 and core 1 so as to cover intersection 7 of roll 2 and core 1 as shown by numerals 10 and 11. Collar device 3 having the coefficient of friction characteristics described prevents bowing and enveloping as shown in FIG. 1. Lateral forces A do not overcome frictional forces between collar device 3 and film roll 2 and therefore lateral forces A are transmitted to collar device 3. Frictional resistant forces B' are overcome by lateral forces A thereby permitting uniform lateral dimensional flow of roll 2. FIG. 2 shows uniform tapering 12 beginning at intersection 7 up to outermost layer 4. Forces B' are between collar device 3 and core 1.

The proportion of core area covered by the collar device is determined by the nature of the thermoplastic film and by the length of core which had originally extended between the film roll intersection and the greater the proportion of collar over the core area, the greater the core. The greater the proportion of collar over the core area, the greater will be the freedom of the film to move uniformly over the core. It is appreciated that if the core extension is substantial, there will be adequate room for lateral dimensional flow before the film creeps over the ends of the roll. Where the roll extension is great enough, the entire core may conceiveably be covered with a continuous collar device. Where a continuous collar device is used, lateral forces A tend to exert forces on the continuous collar in opposite directions thereby acting somewhat as a brake for the lateral flow of the film on the core. Where separate collar devices are used the proportion of surface area not covered by the collar device acts as a restrictive area due to the restrictive frictional forces between the film surface and the core. This causes restriction in the lateral dimensional flow of the roll.

Examples of soft elastic films exhibiting cold flow characteristics when wound under tension include polyvinyl chloride, polyvinylidene chloride, ethylvinyl acetate, rubber hydrochloride, low slip polyethylene, low slip polypropylene and the like, which may be plasticized with known agents such as esters, an example of which is dioctyl phthalate.

Examples of the core material include paper and cardboard, plastics, glass, metals and combinations thereof.

The collar device must be selected for each particular system used, however, polyethylene, wax, soap, water, oil, metals, aluminum foil, nylon, Mylar, Teflon, polypropylene, styrene and the like may be used.

In one specific example, plasticized polyvinyl chloride film was wound on a cardboard core having polyethylene strips as the collar device substantially as shown in FIG. 2. The core was 18.5 inches long and had an outside diameter of 3.5 inches. The polyethylene strip was ¾ mil in thickness and ⅕ inch wide, approximately one half of the polyethylene strip being on each side of the intersection of the film roll on the core. About 4000 feet of plasticized polyvinyl chloride film was wound under approximately 300–400 lbs. per square inch of tension on the collared core. The radical distance between the center line of the core on the outermost layer of film was approximately 3.75 inches. The lateral dimension of the film as wound on the core was 18 inches. The roll was stored in a horizontal position. After 7 days the roll was inspected. The outermost layer of film had a lateral dimension of approximately 17.9 inches and the innermost layer of film had a lateral dimension of 18.4 inches. A uniform taper from the layer adjacent to the core to the outermost layer of film was observed. No bowing or enveloping was observed.

In a similar run, except that no collar device was used on the core, enveloping and bowing was observed. The radial distance from the center line of the core to the beginning of the uniform taper was approximately 2.25 inches. The appearance of the roll and core was substantially as shown in FIG. 1. It is to be affirmatively noted that this run and FIG. 1 do not form any part of the instant invention.

It will be understood that it is intended to cover all changes and modifications of the examples of the invention herein chosen for the purpose of illustration which do not constitute departures from the spirit and scope of the invention.

We claim:
1. A roll of soft, elastic film comprising:
(1) a core;
(2) a plurality of convolutions of said film wound under tension onto said core; and
(3) a movable collar disposed between and substantially in circumferential contact with said core and said film and being in axially slidable relation with said core covering at least one line of intersection between said core and said film.
2. A roll of soft, elastic film comprising:
(1) a tubular supporting core;
(2) a plurality of convolutions of said film wound under tension onto said core; and
(3) a movable collar disposed between and substantially in circumferential contact with said core and said film and being in axially slidable relation with said core covering at least one line of intersection between said core and said film, the coefficient of friction between said core and said collar being:
(a) less than the coefficient of friction between said film and said collar; and
(b) not greater than the coefficient of friction between adjacent layers of said film near the core.
3. The roll of claim 2 wherein:
(1) said core comprises cardboard;
(2) said film comprises polyvinyl chloride; and
(3) said collar comprises polyethylene.

References Cited by the Examiner
UNITED STATES PATENTS
2,953,313   9/1960   Csutor _____ 242—68.5

LOUIS G. MANCENE, *Primary Examiner.*

THERON E. CONDON, *Examiner.*

W. T. DIXSON, *Assistant Examiner.*